(12) United States Patent
LaPoint et al.

(10) Patent No.: US 9,658,324 B2
(45) Date of Patent: May 23, 2017

(54) SYSTEM AND METHOD FOR FILLING GAPS IN RADAR COVERAGE

(71) Applicants: LaPoint-Blase Industries, Inc., St. Louis, MO (US); Christine M. LaPoint, St. Louis, MO (US)

(72) Inventors: Donald A. LaPoint, St. Louis, MO (US); Guy E. Blase, St. Louis, MO (US); Scott Shipley, Satellite Beach, FL (US)

(*) Notice: Subject to any disclaimer, the term of this patent is extended or adjusted under 35 U.S.C. 154(b) by 434 days.

(21) Appl. No.: 14/211,882

(22) Filed: Mar. 14, 2014

(65) Prior Publication Data

US 2014/0266856 A1    Sep. 18, 2014

Related U.S. Application Data

(60) Provisional application No. 61/799,478, filed on Mar. 15, 2013.

(51) Int. Cl.
| | |
|---|---|
| G01S 13/02 | (2006.01) |
| G01S 7/02 | (2006.01) |
| G01S 13/95 | (2006.01) |
| G01S 13/87 | (2006.01) |

(52) U.S. Cl.
CPC ............. G01S 13/02 (2013.01); G01S 7/02 (2013.01); G01S 13/872 (2013.01); G01S 13/951 (2013.01)

(58) Field of Classification Search
CPC . G01S 13/02; G01S 7/02; G01S 13/95; G01S 13/951; G01S 13/87; G01S 13/872
USPC .................................... 342/26 R, 26 D, 59
See application file for complete search history.

(56) References Cited

U.S. PATENT DOCUMENTS

| | | | | |
|---|---|---|---|---|
| 5,583,972 | A | * 12/1996 | Miller | ................ G01S 13/951 324/640 |
| 6,118,427 | A | 9/2000 | Buxton et al. | |
| 6,266,063 | B1 | * 7/2001 | Baron | .................. G06T 17/05 345/419 |
| 6,741,203 | B1 | 5/2004 | Woodell | |

(Continued)

*Primary Examiner* — Peter Bythrow
(74) *Attorney, Agent, or Firm* — Senniger Powers LLP

(57) ABSTRACT

A method of positioning a plurality of radar units in a defined area amongst one or more legacy radar units that provide legacy radar coverage in the defined area is disclosed. The steps of identifying a location of each legacy radar unit, setting a threshold altitude, and determining a legacy occultation of each legacy radar unit from a landscape level up to the threshold altitude are also disclosed. Mapping the legacy occultation of the legacy radar units to provide a three dimensional occultation map in the defined area and locating gaps below the threshold altitude in the legacy radar coverage as a function of the occultation map are also disclosed. Identifying a plurality of sites as a function of the gaps where the sites are accessible to receive a radar unit is also disclosed. Determining an anticipated radar coverage of a radar unit positioned at each of the sites and determining a reduction in the gaps as a function of the anticipated radar coverage are also disclosed. Selecting sites as a function of the reduced gaps is also disclosed. X band, C band or S band radar units can be positioned at the selected sites. The threshold altitude can be 10,000 or 15,000 feet. Affected populations and costs can also be considered in radar placement.

28 Claims, 12 Drawing Sheets

(9 of 12 Drawing Sheet(s) Filed in Color)

(56) References Cited

U.S. PATENT DOCUMENTS

| | | | | |
|---|---|---|---|---|
| 6,771,207 B1* | 8/2004 | Lang | G01S 7/4004 342/120 |
| 7,006,038 B2* | 2/2006 | Smith | H01Q 1/246 342/360 |
| 7,821,448 B2* | 10/2010 | Mahapatra | G01S 7/12 342/179 |
| 8,004,452 B2* | 8/2011 | Rolfe | G08G 5/0013 342/36 |
| 8,022,859 B2* | 9/2011 | Bunch | G01S 13/953 342/26 A |
| 8,054,214 B2* | 11/2011 | Bunch | G01S 7/003 342/26 A |
| 8,077,074 B2* | 12/2011 | Venkatachalam | G01S 7/003 342/104 |
| 8,203,480 B1* | 6/2012 | Woodell | G01S 7/003 342/159 |
| 8,217,828 B2* | 7/2012 | Kirk | G01W 1/04 342/26 R |
| 8,253,621 B1* | 8/2012 | Friesel | G01S 7/003 342/147 |
| 8,344,937 B2* | 1/2013 | Drake | G01S 7/024 342/159 |
| 8,604,963 B1* | 12/2013 | Kronfeld | G01S 7/003 342/26 B |
| 9,057,773 B1* | 6/2015 | Fersdahl | G01S 13/953 |
| 9,223,020 B1* | 12/2015 | Crosmer | G01S 13/951 |
| 9,244,167 B1* | 1/2016 | Oransky | G01S 13/953 |
| 9,250,317 B1* | 2/2016 | Wang | G01S 7/023 |
| 2006/0202886 A1* | 9/2006 | Mahapatra | G01S 7/12 342/176 |
| 2006/0238406 A1* | 10/2006 | Nohara | G01S 7/003 342/90 |
| 2009/0219197 A1* | 9/2009 | Bunch | G01S 7/003 342/26 B |
| 2010/0265120 A1* | 10/2010 | Drake | G01S 7/024 342/36 |
| 2011/0016433 A1 | 1/2011 | Shipley | |
| 2011/0074624 A1* | 3/2011 | Bunch | G01S 7/003 342/26 D |
| 2011/0090111 A1* | 4/2011 | Stagliano, Jr. | G01S 7/003 342/26 R |
| 2011/0102249 A1* | 5/2011 | Venkatachalam | G01S 13/878 342/26 R |
| 2012/0086596 A1* | 4/2012 | Insanic | G01S 13/951 342/26 D |

\* cited by examiner

SYSTEM AND METHOD FOR FILLING GAPS IN RADAR COVERAGE

CROSS-REFERENCE TO RELATED APPLICATIONS

This application is a nonprovisional patent application which claims the benefit of U.S. Provisional Patent Application Ser. No. 61/799,478 filed Mar. 15, 2013, the entire disclosure of which is incorporated by reference.

FIELD OF THE INVENTION

The present invention generally relates to a system and method for identifying gaps in a legacy radar system and then filling those gaps with selected equipment.

BACKGROUND OF THE INVENTION

Weather Radars are deployed in fixed-based and mobile networks to detect hazardous weather and provide advance warnings of approaching severe weather to people and their representatives, to industries for improved safety and performance, and to military and government entities for improved operations and risk abatement. The effectiveness of a single radar and a network or collection of radars is dependent on a number of factors that impact the operational performance of each radar system. Such factors include blockage of the radar beam by natural obstacles such as terrain and vegetation, blockage by manmade obstacles such as towers and buildings, attenuation of the radar signal by the atmosphere and its suspended contents, and beam propagation effects that bend the radar beam away from its normal expected path. Similar factors impact detection systems operating at the visible and infrared wavelengths, with said systems including video cameras and CCD arrays, and active laser range finding systems (lidar).

Methods and tools exist for determining the characteristics of single individual systems, or an effective coverage for a network of radar/detection systems. However, the resulting coverage for a planned network is typically derived by trial and error in the placement of the individual component systems. Such systems are often judged to be insufficient in performance due to gaps in coverage that are discovered after they are put into operation. The NWS employs the experimental method described by Leone (1989) in placing radar units which employs panoramic photography at each proposed site and at great expense.

The blocking of both active and passive signals by terrain is known as "occultation" or "shadowing", and such concept can be applied throughout the electromagnetic spectrum from the subvisible and optical wavelengths to longer wavelengths associated with the X-band, C-band, and S-band radars. Shipley (2008) demonstrates the method and benefits for visualizing traditional 2-dimensional maps of occultation patterns as 3-dimensional displays using the Google Earth™ and ESRI ArcGlobe™ geobrowsers. Shipley (2009) goes further to show how individual occultation patterns for adjacent radars can be superimposed in a geobrowser to visualize the quality and effectiveness of an overlapping collection of radars. WxAnalyst (2011) subsequently developed a method to mosaic these individual occultation patterns to develop a quantitative estimate of the lowest observed altitude due to occultation by terrain for the radars when operating collectively. The composite field showing the lowest observed altitude Above Ground Level (AGL) due to occultation by terrain has become known as the "Shipley Floor."

It would be advantageous to have a system and method for identifying gaps in a legacy radar system that also identified sites for additional radar equipment to be added to predictably fill the gaps and meet additional considerations relevant to the site and equipment selection decision.

SUMMARY OF THE INVENTION

The present invention provides a system and method for identifying gaps in a legacy radar system and then filling those gaps with selected equipment.

In accordance with one aspect, there is provided a method of positioning a plurality of radar units in a defined area amongst one or more legacy radar units that provide legacy radar coverage in the defined area. The method includes the steps of identifying a location of each legacy radar unit, setting a threshold altitude, and determining a legacy occultation of each legacy radar unit from a landscape level up to the threshold altitude. The method also includes mapping the legacy occultation of the legacy radar units to provide a three dimensional occultation map in the defined area and locating gaps below the threshold altitude in the legacy radar coverage as a function of the occultation map. The method also includes identifying a plurality of sites as a function of the gaps where the sites are accessible to receive a radar unit. The method also includes determining an anticipated radar coverage of a radar unit positioned at each of the sites and determining a reduction in the gaps as a function of the anticipated radar coverage. The method also includes selecting sites as a function of the reduced gaps.

The method may include the step of positioning an X band, C band or S band radar unit at the selected sites. The threshold altitude can be less than 500, 1,000, 5,000, 10,000, 12,000 or 15,000 feet. A percentage of the occultation map below the threshold altitude corresponding to the gaps can be calculated. The calculated percentage can be reduced as a function of the anticipated radar coverage and the sites can be selected as a function of the reduced percentage corresponding to the gaps. A population associated with the gaps can also be calculated and the calculated population can be reduced as a function of a reduction in the gaps corresponding to the anticipated radar coverage. The sites can be selected as a function of the reduced calculated population. A cost can be associated with each of the sites and the sites can be selected as a function of the reduced gaps and of the cost associated with the sites.

In accordance with another aspect, there is provided a computer system containing computer executable instructions executable by a processor for determining anticipated radar coverage and for determining a reduction in gaps. The system includes computer executable instructions for receiving input data identifying a location of each legacy radar unit, receiving input data setting a threshold altitude, and determining a legacy occultation of each legacy radar unit from a landscape level up to the threshold altitude. The system also includes computer executable instructions for mapping the legacy occultation of the legacy radar units to provide a three dimensional occultation map in the defined area, color-coding gaps below the threshold altitude in the legacy radar coverage as a function of the occultation map, and receiving input identifying a plurality of sites as a function of the gaps, wherein the sites are accessible to receive an X band radar unit. The system also includes computer executable instructions for determining an anticipated radar coverage of additional radar unit positioned at each of the sites and color-coding the occultation map to reveal a reduction in the gaps as a function of the anticipated radar coverage.

The system may also include computer executable instructions for calculating a percentage of the occultation map below the threshold altitude corresponding to the gaps and for reducing the percentage as a function of the anticipated radar coverage. The threshold altitude can be less than 500, 1,000, 5,000, 10,000, 12,000 or 15,000 feet. The system may also include computer executable instructions for calculating a population associated with the gaps and for reducing the calculated population as a function of a reduction in the gaps corresponding to the anticipated radar coverage. The system may also include computer executable instructions for associating a cost with each of the sites such as a real estate cost, utilities cost or a maintenance cost. The system may also include computer executable instructions for determining an occultation of an X band, C band or S band radar unit at the sites and for determining the occultation of the X band, C band or S band radar at a plurality of physical locations within a site.

Other objects and features will be in part apparent and in part pointed out hereinafter.

BRIEF DESCRIPTION OF THE DRAWINGS

The application file contains at least one drawing executed in color. Color copies of FIGS. 1-5 and 7-10 are available via the U.S. Patent and Trademark Office website in the file of corresponding U.S. Provisional Patent Application Ser. No. 61/799,478 filed Mar. 15, 2013 and in the file of this U.S. patent application. Copies of this patent or patent application publication with color drawing(s) will be provided by the Office upon request and payment of the necessary fee.

Corresponding reference characters indicate corresponding parts throughout the drawings.

DETAILED DESCRIPTION

Figure 1:
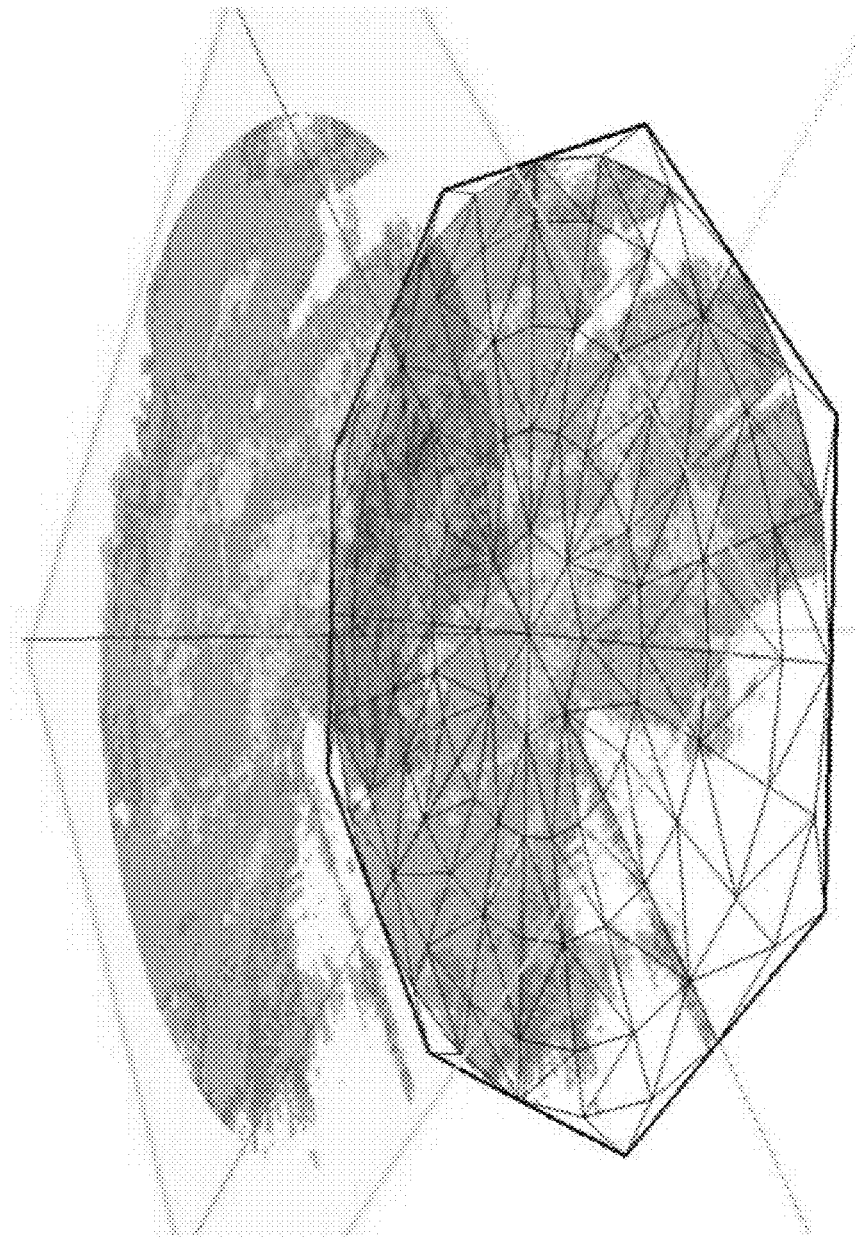
FIG. 1 is a color photo showing the draping of a derived radar product onto a COLLADA™ model for an azimuthal scan. This centroid surface follows the probable location of most beam energy at each elevation angle, which is a uniformly curving (non-flat) surface extending from the radar axially out to the maximum operating range.

The performance of legacy radar systems can be improved and enhanced ad hoc by placing smaller radar units at locations which fill in the gaps of the existing system. The innovation described herein provides a means to define the number and characteristics of gap-filling systems which can be added to an existing sensor network and which will result in a higher level of overall system performance. This provides a higher level of performance in hazard detection and warning by the entire system or network using fewer radar sites. This also provides the ability to accurately forecast the performance of gap-filling systems before they are installed which greatly enhances the gap-filling process.

When filling the gaps in a legacy system, the performance characteristics of the existing sensor system are determined so that the Shipley Floor for those legacy sensors in their respective geographic locations can be generated. The performance characteristics of the available sensors that may be added to the legacy system are also determined. Given a defined set of potential locations for placement of gap-filling sensor systems, the present system and method are used to derive analysis products showing the improvement to overall system performance that is gained by inclusion of defined combinations of gap-filling systems within the existing collection. Such analyses include improvements to detection and warning of severe weather to target populations and industries within the regions served by the existing collection. Such analysis includes the impacts to occultation due to manmade objects such as towers and buildings, as well as non-terrain impacts related to vegetation and other semi-permanent natural features such as snow/ice and sand. Such analysis also accounts for the impact of radar beam path bending or refraction due to Anomalous Propagation (AP) to realize the impact of AP to the Shipley Floor. The analysis products are derived and visualized as new composite products for the combined systems which include the existing systems and the gap-filling additions. As a result, these analyses allow responsible parties to make informed decisions on commitments to gap-filling projects.

These methods are also effective to describe occultation impacts to surveillance systems operating in the visible (daytime) and infrared (nighttime) environments, as well as for submillimeter imaging devices which can detect targets through an obscuring medium such as fog and precipitation. The goal remains the same in radar and non-radar applications, namely to define the location and severity of voids in the detection pattern, and to eliminate or reduce such voids through provision of gap-filling devices and systems.

Here follows a more complete description broken into numbered segments identifying steps that may be taken to predictably fill gaps in a legacy system.

(1) Development of Performance Description and Parameters for an Individual Radar System.

Each radar system is analyzed for its operational performance as a function of beam elevation angle and radar range. Radar range varies from zero at the radar to a maximum range depending upon the ability of the system to sustain a useable signal to noise ratio (SNR). Beam elevation is typically varied from zero degrees in elevation with respect to the local horizontal up to 90 degrees when pointing toward the local zenith. Some systems are capable of broader scanning including beam elevation angles below the horizontal and "over the zenith" beam scanning where the coupled transmitter and receiver are scanned up to the zenith along some beam azimuth angle, then crossing the zenith and descending in beam elevation at the opposing azimuth which is 180 degrees from the original azimuth angle. Complex programmed beam scan patterns are also supported by computer control of the radar elevation and azimuth angle drives for steerable systems, and by electronic pointing techniques for phased array systems. The traditional scanning patterns for radar are known as Planned Position Indicator (PPI) for variation in azimuth with constant elevation, and Range Height Indicator (RHI) for variation in elevation with constant azimuth. Radar system performance estimates also require specification of the wavelength or frequency, feed horn height Above Ground Level (AGL), and specification of the beam divergence pattern including the vertical and horizontal beam widths and the far field distribution of beam energy within the beam pattern.

(2) Visualization of Individual System Performance in a Geobrowser Using COLLADA™ 3D Modeling to Show Occultation.

A geobrowser is used to display detailed and interactive visualizations of the surface of the radar beam centroid as a function of range for each beam elevation angle. This centroid surface shows the probable location of most beam energy at each elevation angle, which is a uniformly curving (non-flat) surface extending from the radar axially out to the maximum operating range. This surface has been modeled in earlier efforts using a large set of points, but is more recently accomplished using the COLLADA™ commercial open standard for 3D graphics exchange (Arnaud, 2006), with operating characteristics draped upon the "wireframe" COLLADA model as an image containing derived products presented as a function of beam azimuth and range. The draping of a derived radar product onto a COLLADA™ model for an azimuthal scan is shown in FIG. 1. Derived products include but are not limited to signal reflectivity or precipitation rate, Doppler spectrum shift or radial velocity, and/or degree of radar beam occultation or blocking by obstacles as a percentage ranging from zero to 100%. The COLLADA model approach supports 3-dimensional animation in specific geobrowsers such as Google Earth or NASA World Wind, and others as they achieve the ability to support animation. See Arnaud, R., and Barnes, M. C., 2006, COLLADA®—Sailing the Gulf of 3D Digital Content Creation, Khronos Group Open Standard: A. K. Peters, Ltd., Wellesley, Mass., 240 p.

(3) Use of Color to Convey the Degree of Impact to the Quality of System Operation.

Figure 2A:
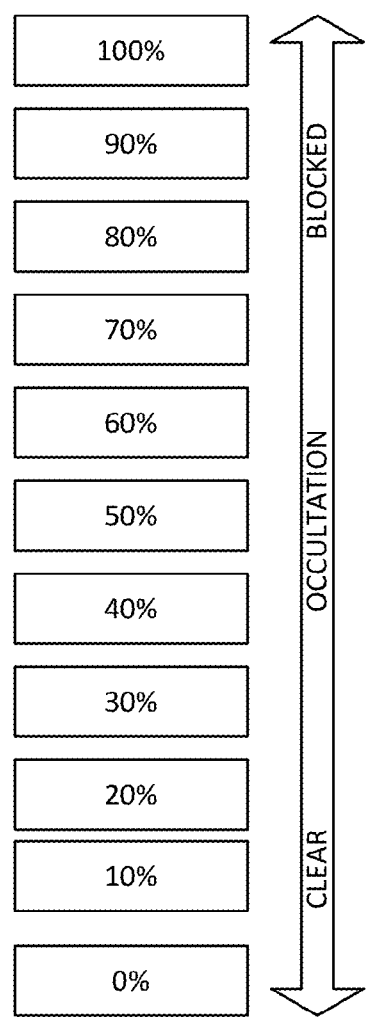
FIG. 2A is a black and white version of a color photo showing the color keys for OCCULTATION. Each box has a distinctive color (not shown in this black and white block diagram). For occultation, the 50% blocked condition is located at the boundary of the dark green and yellow bands. Greens (e.g., dark green at 40%; light green at 30%) and blues (e.g., light blue at 20%; dark blue at 10%) indicate that the beam CENTROID has cleared known obstacles. Yellows (e.g., yellow at 50%; orange at 60%) and reds (e.g., red at 70%; light purple at 80%; dark purple at 90%; gray at 100%) indicate that the beam CENTROID is intercepted by obstacles.
Figure 2B:
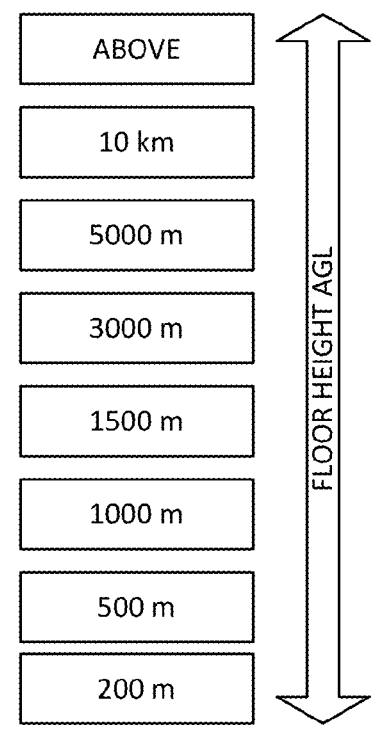
FIG. 2B is a black and white version of a color photo showing the color keys for FLOOR. Each box has a distinctive color (not shown in this black and white block diagram). The Floor value indicates that radar beam CENTROID is no higher than the indicated color. For example, a yellow Floor would indicate that beam centroids are in the range from 1000 m to 1500 m AGL (Above Ground Level). Other examples: a purple Floor would indicate that beam centroids are in the range from 0 m to 200 m AGL; a red Floor would indicate that beam centroids are in the range from 200 m to 500 m AGL; an orange Floor would indicate that beam centroids are in the range from 500 m to 1000 m AGL; a dark green Floor would indicate that beam centroids are in the range from 1500 m to 3000 m AGL; a light green Floor would indicate that beam centroids are in the range from 3000 m to 5000 m AGL; a light blue Floor would indicate that beam centroids are in the range from 5000 m to 10 km AGL; and a dark blue Floor would indicate that beam centroids are in the range above 10 km AGL.

A color key for the occultation product is provided in FIG. 2. Color is used to visually indicate degree of blocking Blues and greens indicate that less than 50% of the beam is blocked by terrain. The NWS uses 50% occultation to indicate that a radar is receiving acceptable signal levels. Yellows and reds indicate that more than half of the radar beam is blocked, and the color grey is used for total occultation (100%).

(4) COLLADA™ 3D Models to Depict Occultation by Manmade Objects Such as Towers and Buildings.

Figure 3:
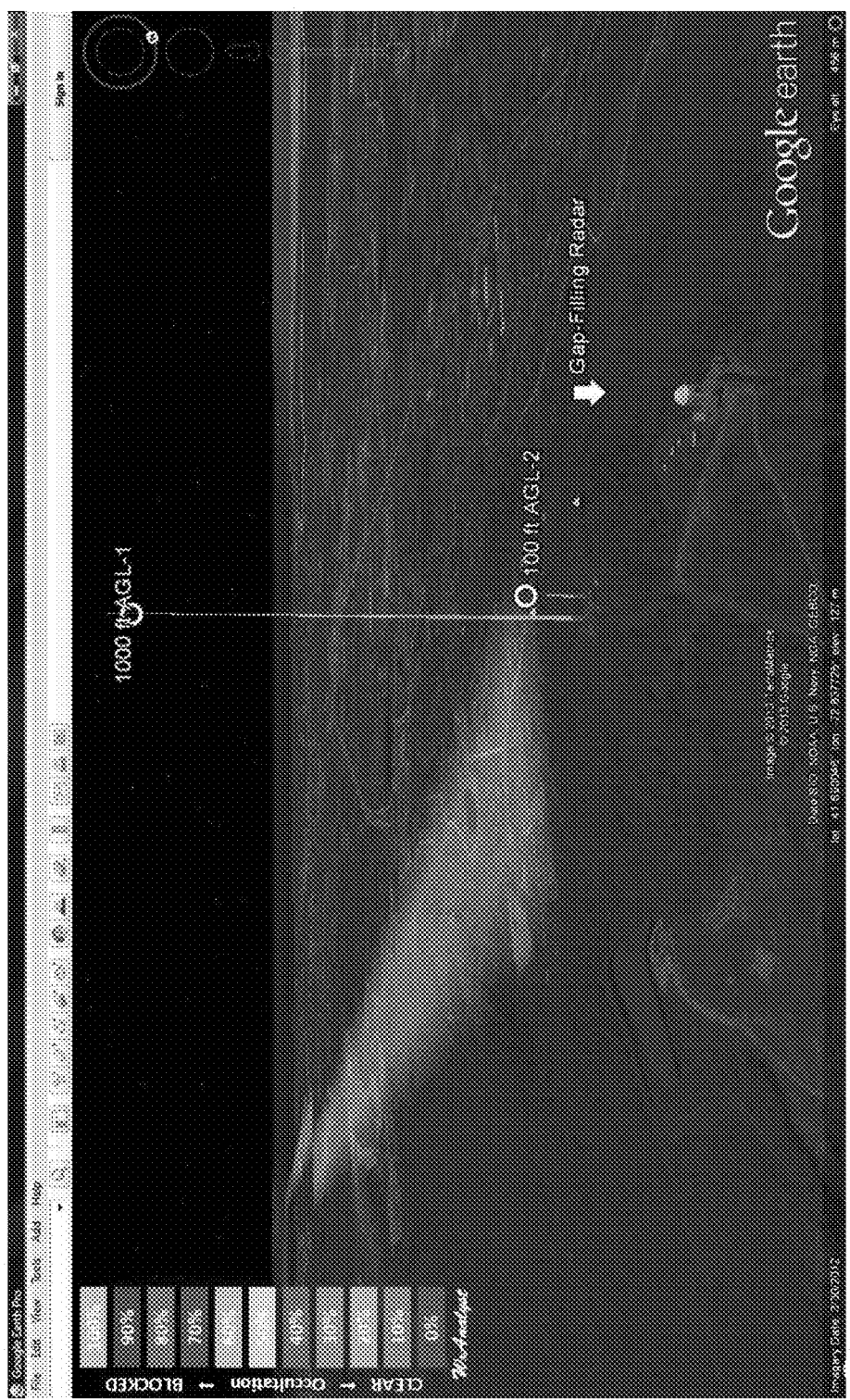
FIG. 3 is a color photo showing KML models of existing towers that may obstruct a planned gap-filling radar. The geobrowser approach graphically depicts how and where manmade and natural obstacles obstruct a radar beam. The scale at the top left of the photo corresponds to FIG. 2A.

Obstacles that may interfere with radio beam propagation can be faithfully reproduced using the COLLADA™ modeling formalism. This is shown in FIG. 3 where two existing radio towers are represented in their actual place in the Google Earth geobrowser with respect to geography and local terrain. A hypothetical planned gap-filling radar system is shown on its own tower and the intersection of the azimuthal beam pattern with the existing obstacles is visualized.

(5) Refinement to Show the Effect of Occultation by Objects at Higher Spatial Resolution Including Very High Spatial Resolution for Manmade Objects.

The existing techniques use terrain databases at coarse (1 km) and medium (100 meter) spatial resolutions, which are on the order of the typical radar beam size (vertical and horizontal beam widths). Such spatial resolutions are inappropriate for modeling manmade objects with have much smaller dimensions. To accomplish this, finer spatial resolution grids are employed at 30 meter and 3 meter resolutions, and the existing methods include the manmade objects by editing the terrain databases to include their features.

(6) Alternate Approach which Directly Calculates Signal Impacts Using COLLADA™ Models for Manmade Obstacles.

Alternately, the COLLADA™ model can be employed directly to calculate the intersection of the radar beam centroid surface with the manmade obstacle so described. This approach involves geometric calculation of the intersection of the surfaces described by the COLLADA models for both the radar beam surface and the obstacles. Such mathematical operations that combine surfaces and volumes described by COLLADA models are commonly known as COLLADA Computing™.

(7) Estimating Spurious Signals Generated by Reflection or Scattering from Objects.

COLLADA Computing™ supports detailed mathematical operations for the interaction of a radar (or optical) beam with a complex object that has been described by a COLLADA model. Such calculations are inherently linear and can be used to predict the reflection, absorption and scattering of beam energies from the various surfaces of the complex object so modeled. This approach has been used effectively to model the surfaces presented by wind power generators, buildings, and other towers that are found in the direct path of a radar system.

(8) Impacts to Doppler Detection Systems by Moving Objects Such as Wind Power Generators.

Reflections from wind power generators have been observed by NEXRAD systems as interference which shows up at the location of the wind power installation and appears to be moving (although stationary) at a speed related to the rotation rate of the wind turbine propellers. This interference has been observed to be a function of the wind direction, and is considered as another source of ground clutter that interferes with weather radar operations. Such ground clutter will present itself differently to gap-filling systems that observe the same objects but from a differing perspective. The COLLADA method is capable of predicting the clutter signals that should be observed by a moving tower object provided that the mechanical designs of that object are known prior to the calculation so that an effective COLLADA model of that object is constructed and/or made available.

(9) Construction of an "Occultation Stack" to Convey and Depict the Overall Performance of the Volume Scan.

Figure 4:
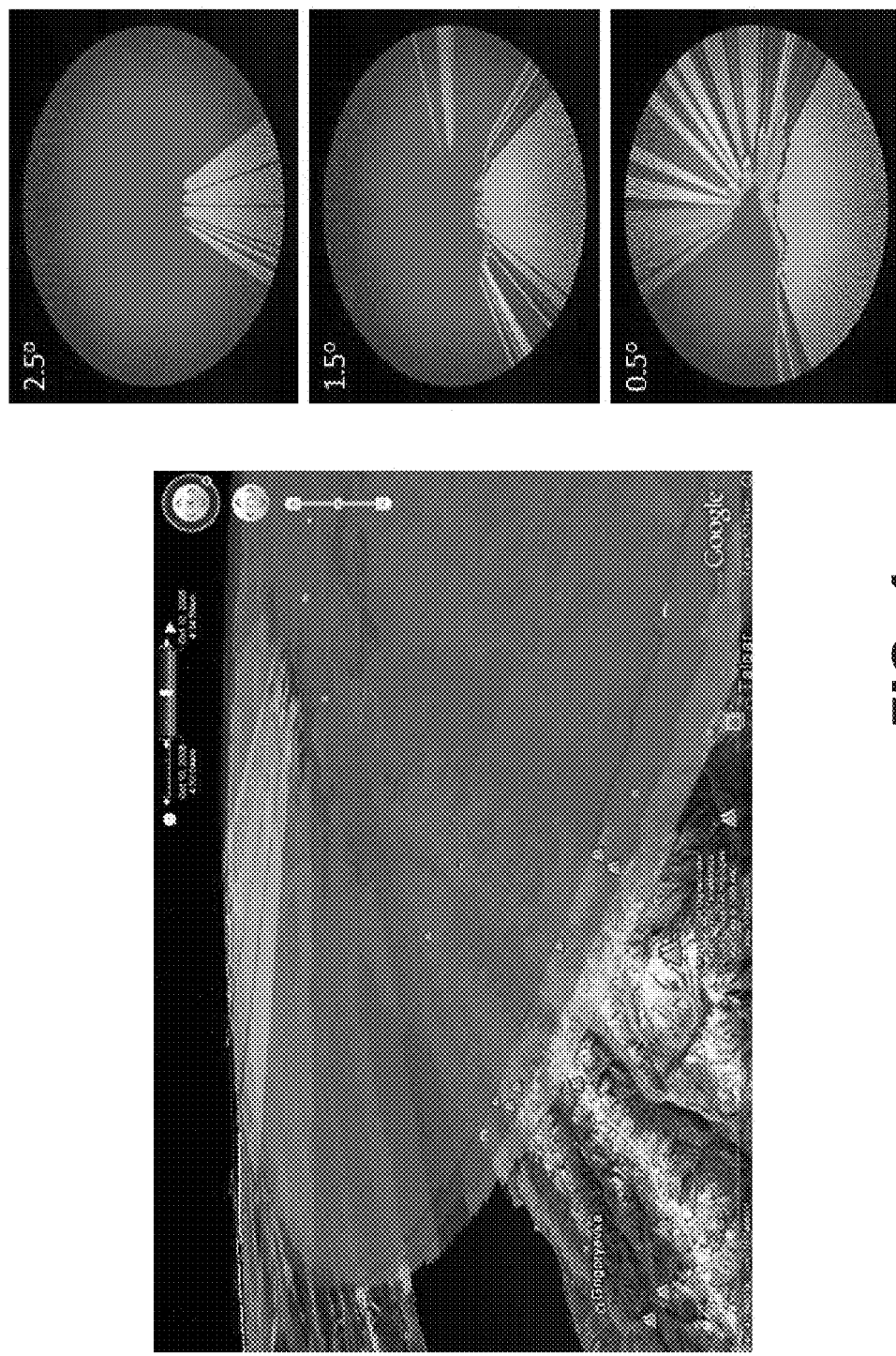
FIG. 4 are color photos showing the occultation for a hypothetical weather radar system at Manas International Airport, Bishkek, Kyrgyzstan. PPI occultation patterns for three primary elevations [0.5, 1.5 and 2.5 degrees] are inset to the right.

Individual occultation patterns are developed at PPI for each beam elevation angle, and the beam elevation angle is incremented until no further obstructions are encountered in the beam path. For terrestrial applications, beam occultation is synonymous with obstructions encountered at lower elevation angles. This process is shown in FIG. 4, where beam occultation patterns are calculated for several beam elevation angles as shown to the right. The Google Earth geobrowser then allows each of these surfaces to be assembled into a combined model which is known as an "occultation stack," as shown on the left. As with manmade obstacles, the geobrowser shows the terrain which is obstructing the beam propagation at the precise location where the obstruction is taking place.

(10) Identification of Regions or Voids where there is No Signal and Nominal Identification of the "Lowest Detection Altitude" as Height AGL for Normal Beam Propagation (No AP).

It is important to recognize when obstruction by terrain intersects the radar beam. If the terrain is sufficiently tall so that the entire beam is blocked, the occultation is said to be 100%. This condition is shown as the grey areas in FIG. 4, and can be verified by noting the mountains which are located at the point of obstruction and extending through several beam elevation angles at the same beam azimuth angles and radar range. It is useful to use a neutral color to describe the voids, since this allows viewing of features that lay below the COLLADA surfaces. These results are obtained using a Standard Atmosphere for temperature and humidity, which provides for a nominal refraction of the radar beam slightly downward toward the earth surface. Use of the Standard Atmosphere identified this result as the normal for beam propagation. When atmospheric conditions sufficiently diverge from the Standard Atmosphere, then the radar centroid may follow a different path, a condition which is commonly known as Anomalous Propagation (AP).

(11) Combination of the "Lowest Detection Altitude" for a Collection of Radar Systems into a Mosaic Showing a Composite of Signals from all Systems—the "Shipley Floor."

Figure 5:
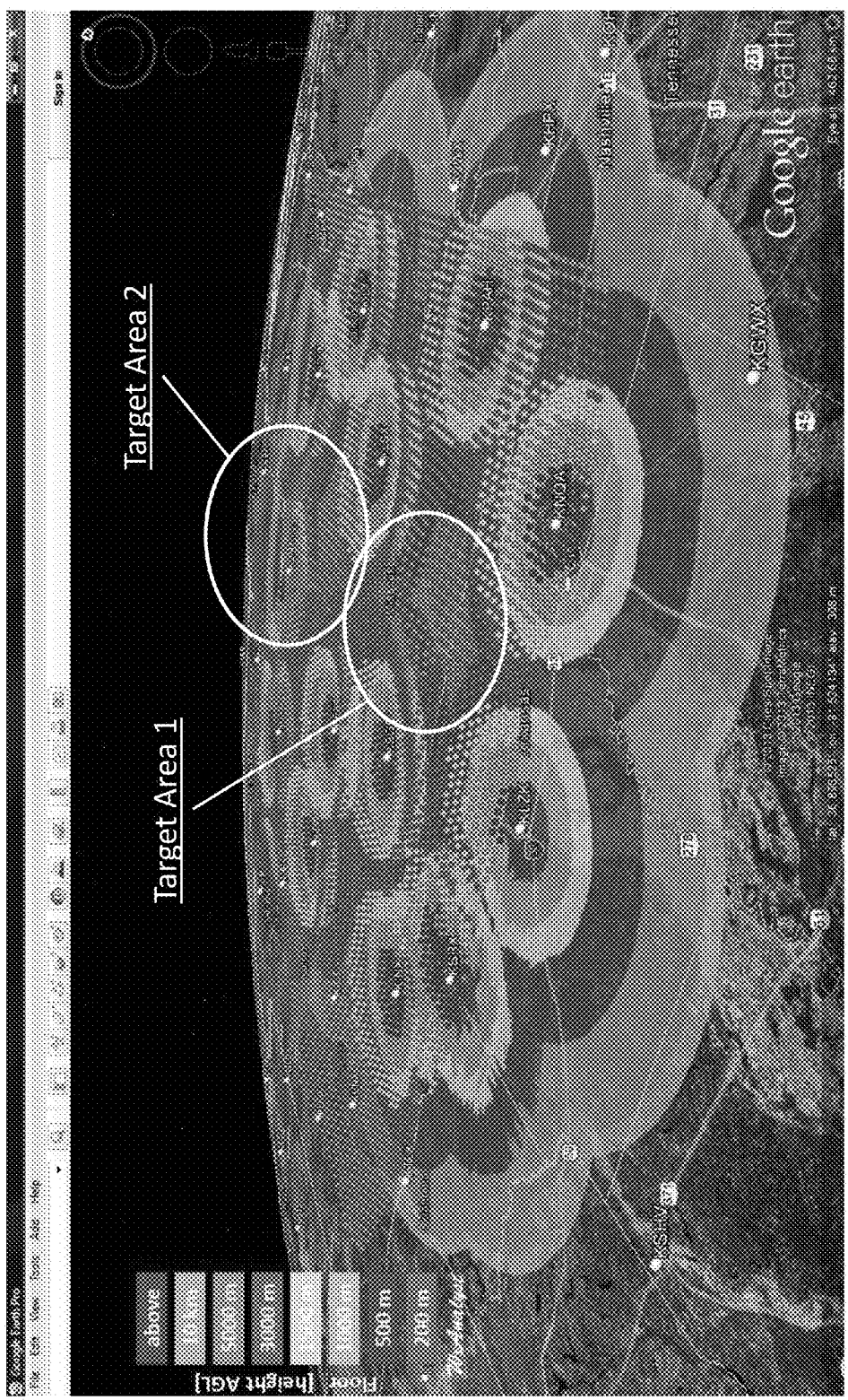
FIG. 5 is a color photo showing Shipley Floor shown in the Google Earth geobrowser for existing NWS NEXRAD radar system coverage over Missouri. Deficiencies in radar coverage are obvious and circled as Target Areas 1 and 2, where populations may be threatened due to higher likelihood of tornadoes going undetected as they pass "below the radar". The scale at the top left of the photo corresponds to FIG. 2B.

The method keeps track of the lowest edge of the radar beam as it clears obstacles to propagation. The effect of the obstacles is to remove energy from the beam as it intersects the obstacles. The height of this lower edge is defined in meters Above Ground Level (AGL) and is considered to represent the lowest altitude that can be observed by each radar without the presence of AP. The lowest detection altitude is now known as the "Shipley Floor." When multiple radar systems are operating collectively to monitor weather in a specific region, the floor of the collective observation is the lowest detected altitude from any of the systems currently in operation. Therefore it is useful to construct a mosaic of the several floors to produce a single product describing the lowest detection altitude for the system of radars. An example mosaic of the Shipley Floor is shown in FIG. 5 for the State of Missouri, comprised of thirteen (13) NEXRAD installations with three (3) operating at locations within the State, and another ten (10) bracketing the State. The Shipley Floor is shown in the Google Earth geobrowser both as a GroundOverlay which is draped on the surface, and in 3D as a set of points spaced uniformly across the State of Missouri at 5 km spatial resolution.

(12) Use of Color to Convey the Shipley Floor.

FIG. 2 provides the definition of the color scheme used to depict the Shipley Floor as shown in FIG. 5 and subsequent figures where the identical information is repeated. Color is used to draw attention to the conditions of interest, which may vary depending on the application. For example, users who are interested in the locations where the radar systems may interact with wind power generators will be interested in colors denoting a Shipley Floor close to the surface (below 200 meters). Other color breaks have been adopted from their common use by the National Weather Service. The 2,000 meter break is useful for showing where systems can normally detect tornadoes, since most radar detections of tornadic signatures are obtained below 2,000 meters AGL. The 5,000 meter break is located approximately with the 500 hPa surface, and is typically considered to be the top altitude for precipitation signals in widespread snowstorm events. The 10,000 meter break is located approximately at the altitude of the tropopause, which is connected with the average height of most thunderstorm activity in the United States. Shipley Floors above 10,000 meters will only be useful in detecting severe thunderstorm activity which punch through the tropopause and extend to significantly higher altitude (for example 70 kft). Since each break in the Shipley Floor is associated with a significant altitude for meteorological phenomena, this color scheme can be directly used to inform decision makers on the general capabilities of the collective radar system network.

(13) 3D Models of the Shipley Floor Presented in KML, GIS Surface and JAVA.

FIG. 5 shows the Shipley Floor shown in the Google Earth geobrowser both as a GroundOverlay which is draped on the surface, and in 3D as a set of points spaced uniformly across the State of Missouri at 5 km spatial resolution. Other 3D depictions are possible depending upon the geobrowser in use, including gridded surfaces in Geographic Information Systems (GIS) such as ESRI ArcGIS, ArcGIS Explorer, ArcScene, and ArcGlobe, and JAVA methods employed in NASA World Wind and other JAVA-based geobrowsers. The information is interchangeable across these formats and can be adapted to emerging formats and techniques as the geobrowser technology continues to evolve.

(14) Defining Optimal Regions for Placement of Gap-Filling Systems.

As a result of the general discussion above, the Shipley Floor colorization can be used to provide a rough idea of the capabilities for weather hazard detection of an existing radar system network. In the case of tornadic signature detection, any locations or regions in the State of Missouri as shown in FIG. 5 where the Shipley Floor exceeds 3,000 meters is likely to pose a risk for direct detection of the tornado signature couplet. That is, any area in FIG. 5 where the Shipley Floor is green or blue should be considered to be putting populations at risk for tornado warnings. This is easily identified as Target Areas 1 and 2, which are circled and identified in FIG. 5. The gap-filling process now follows the flow chart in FIG. 6 to define the optical regions for placement of gap-filling systems and equipment, the overarching goal being to provide greater coverage with as little additional equipment as possible.

Figure 6:
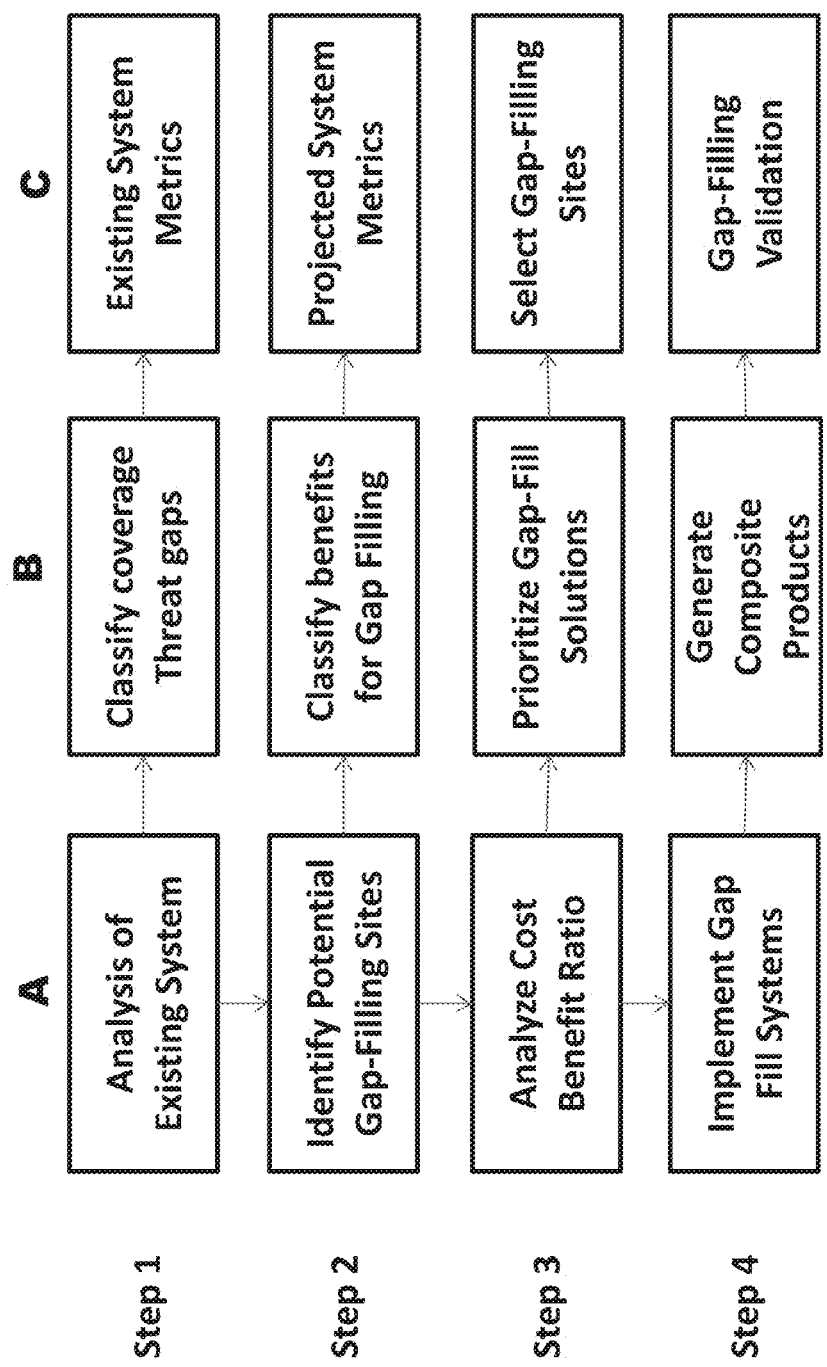
FIG. 6 is a flow chart for the gap filling calculation. In Step 1 the existing system network is analyzed and performance metrics are developed. In Step 2 potential gap-filling sites are identified and classified according to their expense and difficulties for implementation. In Step 3 the various combinations of gap-filling configurations are analyzed and compared to determine those solutions which provide the greatest benefit at lowest cost. In step 4 the selected gap-filling technique is implemented and the performance projections are verified.

Referring to flow chart in FIG. 6:

In Step 1A, the existing observing system is analyzed to determine its operating characteristics, resulting in a set of graphic and tabular products including the Shipley Floor example as shown in FIG. 5. In Step 1B, the services and coverages supported by the existing system are classified using approaches and schemes such as the Shipley Floor with interpretations as described above. In Step 1C, this interpretation is then converted into a set of metrics that can describe the effectiveness of the existing network.

In Step 2A, candidate and potential gap filling sites are identified based upon the metrics from Step 1C and coverage classifications derived in Step 1B. In Step 2B, the benefit of each gap-filling system is derived by rerunning the original analysis with the gap-filling system or systems included. In Step 2C, the metrics are recalculated with the assumption that the gap-filling systems have been included.

In Step 3A, the costs of each gap-filling solution of Step 2C is itemized to build an estimate of the Cost Benefit Ratio for comparison across the range of gap-filling solutions. Once the range of solutions is defined and estimated, they can be prioritized in Step 3B for use by decision makers to select in Step 3C what additional or enhanced protections can be obtained given the resources available.

In Step 4A, the elected gap-filling solution(s) in Step 3C is(are) implemented are the resulting performance of the new system is validated. New composite products are generated in Step 4B, and the operations are monitored and compared against the projections used in defining the gap-filling recommendation to validate gap-filling in Step 4C.

(15) Types of Gap-Filling Systems Available.

The voids present in the collection of S-band weather radars such as NWS NEXRAD and FAA Terminal Doppler Weather Radar (TDWR) are primarily associated with occultation blockage by terrain and manmade structures, and those areas "below the radar" which are not sampled due to the normal rise is altitude of the radar beams as they gain distance or range from the radar source. Such voids are present for any radar even without occultation, and occultation serves to raise or increase the Shipley Floor by adding to that void at the lower beam elevation angles when blockage is present. The system of choice in filling such voids are lower cost X-band and C-band radar systems which operate with lower power and are available in significantly smaller configurations. However, gap-filling could also be accomplished through provision of another S-band system, particularly when the distance or spacing between the radar systems in the basic network is large with respect to the nominal operating range.

However, other active and passive systems may be reasonable for gap-filling under certain applications, including optical, infrared and submillimeter based technologies, such as laser radars (lidar) and camera systems, or bistatic system geometries. In cases where derived products such as precipitation reaching the ground are the primary goal, the gap-filling system may be more reasonably sustained through use of a network or mesonet of surface instrumentation and sensors, such as rain gages or other active technologies which sample the atmosphere in an active fashion, including ceilometers, scintillation based devices such as present weather sensors, transmission attenuation systems or devices which operate based upon the reception of known signals from cellular towers.

(16) Gap-Filling by Addition of Fixed-Based X-Band, C-Band, or S-Band Radar System(s).

Figure 7A:
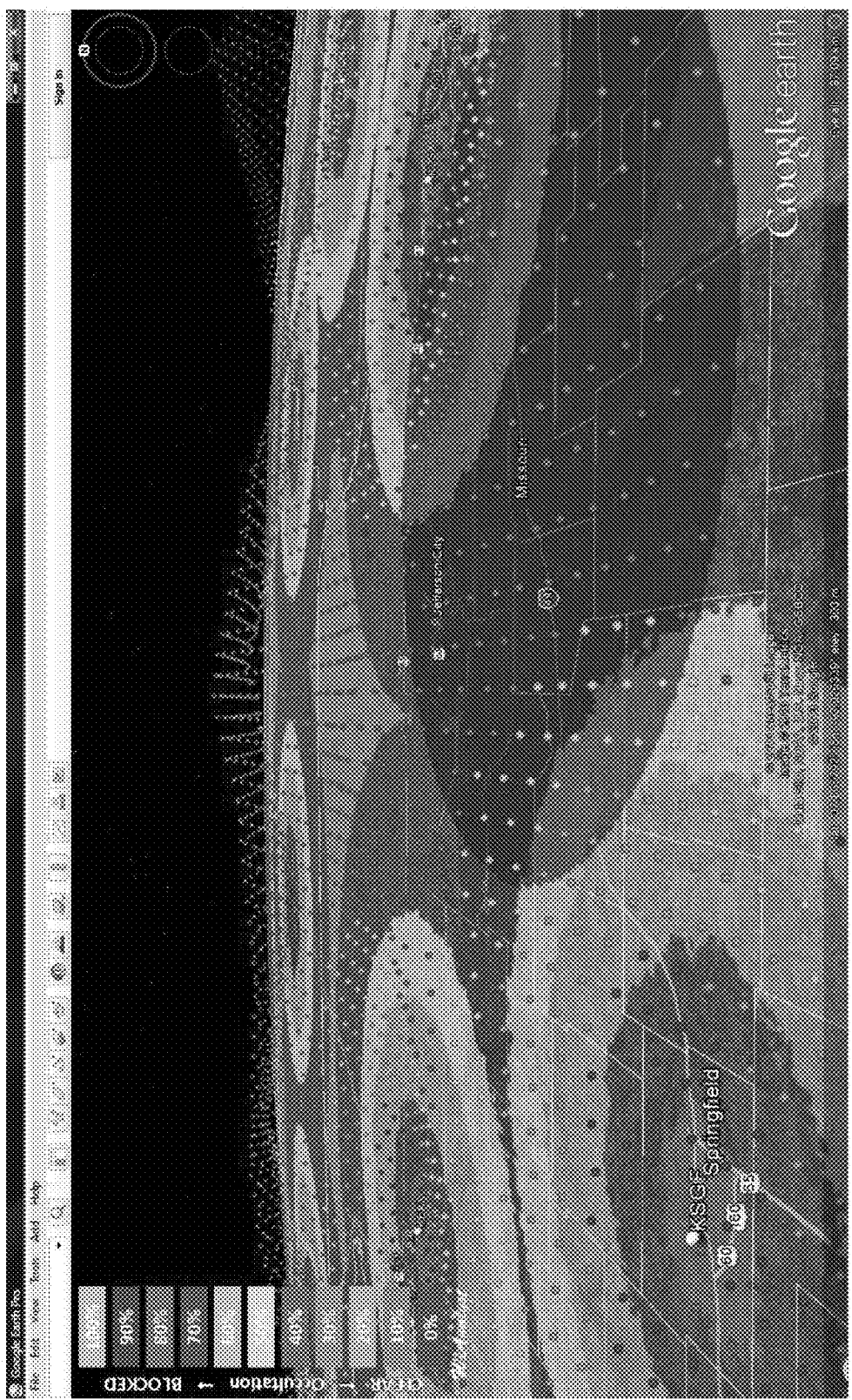
FIG. 7A is a color photo showing the Floor before the addition of the gap filling system, with the blue surface indicating the occultation pattern for the additional system.
Figure 7B:
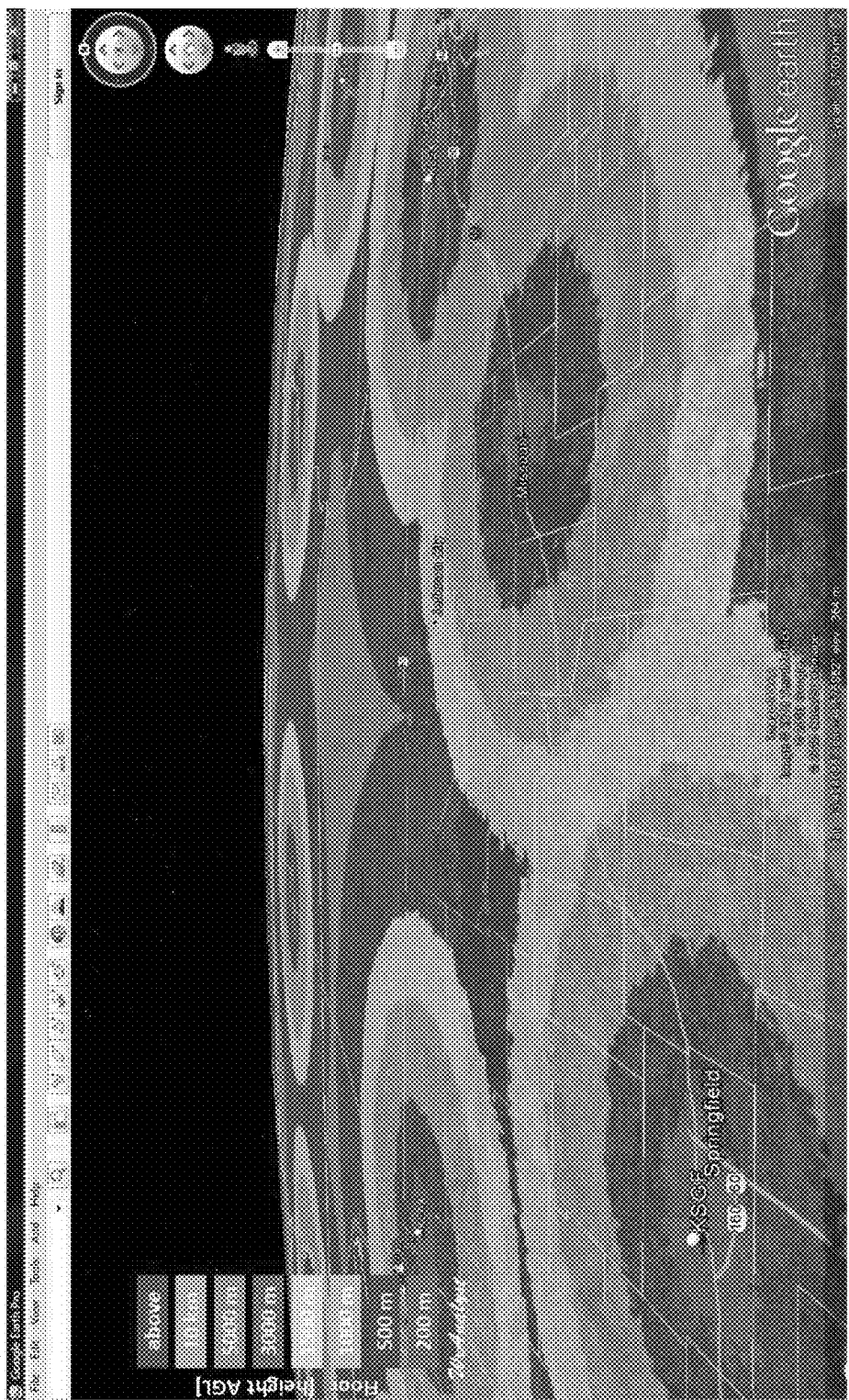
FIG. 7B is a black and white version of a color photo showing the Floor that is projected to result after the addition of the gap filling system. The scale at the top left of FIG. 7A corresponds to FIG. 2A. The scale at the top left of FIG. 7B corresponds to FIG. 2B.

When using fixed-based radar systems to reduce "under the radar" voids between radars due to large spacing or voids behind obstacles due to occultation, the techniques employed under Step 1 above can be used to develop the characteristics of the new and enhanced radar network. Sites chosen for the new gap-filling systems are ideally located between radars in the existing system, but must if feasible be placed in positions that are generally free of obstacles that may give rise to severe occultation. Other practical considerations that impact installation and operating costs include the availability of infrastructure for provision of electric power and communications of information, security of the site if it is to be operated unattended, and any other factors that may impact the quality or sustainability for system operation. The addition of a fixed-base gap-filling radar over a data void region in Southern Missouri is shown in FIGS. 7A and 7B.

(17) Gap-Filling Through the Addition of Mobile X-Band or C-Band Radar System(s).

EWR has developed affordable and highly reliable self-contained radar systems that are mounted or can be quickly transported by utility or other suitably equipped vehicles to selected sites for operations of a temporary or semi-permanent basis. Once such a system is parked and placed in operation, it can be characterized using the same techniques employed under Step 1 as described above. A special case exists for gap-filling radars which are designed to operate while in motion, which includes systems deployed on trucks, boats and/or aircraft. Applications for such highly mobile systems include strategies where a system must be located in close vicinity to the target, such as is the case in tornado chasing for direct measurement of funnel properties and behaviors.

(18) Estimating the Benefit of the Addition of a Gap-Filling System(s) and Figures of Merit for Decision Makers.

Figure 8:
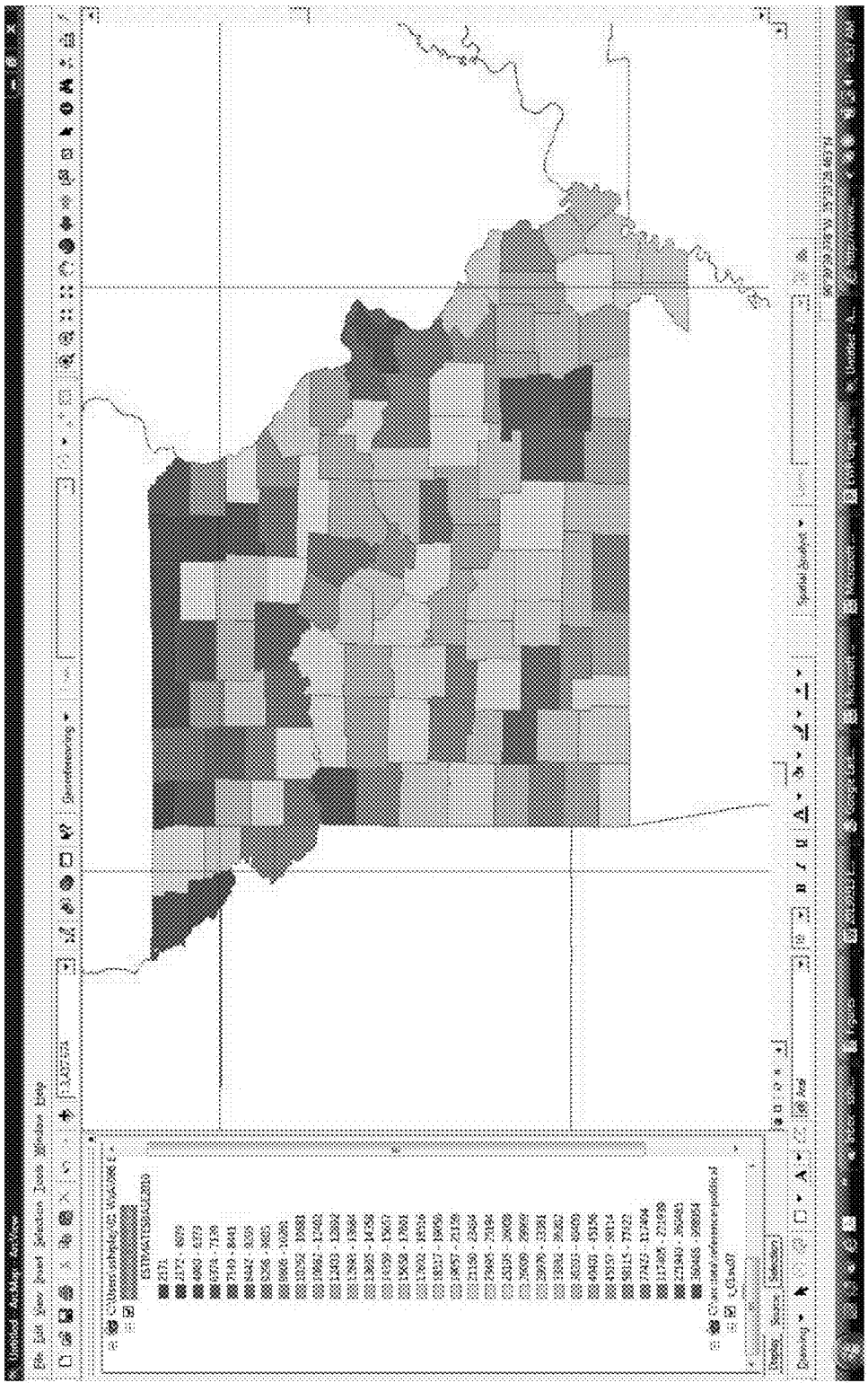
FIG. 8 is a color photo showing Geographic Information System depiction for population by county based upon the 2010 United States Census. The color scale on the left varies from red (3604486-998954) to blue (2171 or less). Each county is filled with a color corresponding to the scale on the left.

Decision makers often are required to consider the potential benefits of the investment with respect to improved services or protections provided to a community or population, or to an industry or government activity that will benefit from the implementation of the gap-filling measures. A good example for such a decision is the improved severe weather warnings provided to target populations. In order to quantify such figures of merit, supplemental information on the concentrations of target populations are needed and must be merged with the spatial analysis of the gains in coverage afforded by the gap-filling systems. A typical source for such data is the United States 2010 Personal census, and the 2012 Industrial Census, which provides information on concentrations of populations and related characteristics, and the activities engaged by industries which may be affected by improved weather technologies. FIG. 8 shows the US 2010 Census results for population by county in the State of Missouri, as imported to and prepared for analysis using a Geographic Information System (GIS).

(19) Figures of Merit for Threats to Populations and Severe Weather Statistical Information.

Figure 9:
FIG. 9 is a color photo showing Historical mapping of known tornado tracks classified by severity in the State of Missouri for the time period from 1950 through 2008. Source National Weather Service (NWS).

Considering the experience of no warnings provided to underserved communities when tornadoes go undetected "under the radar" in high-floor terrain, the provision of a gap-filling radar may improve the chances of individuals and families who may face injury or even death without warning from the radar system in place that is designed to protect them. National Weather Service records for Tornado Tracks in the State of Missouri accumulated during the time period from 1950 to 2008 are shown in FIG. 9. When compared to the Shipley Floor result for the existing NEXRAD system currently in place, it becomes obvious that tornadoes are common occurrences in regions where they may pass undetected "under the radar".

(20) Figures of Merit for Estimation of Precipitation.

Not all of the liquid and solid phase water that is observed by weather radar will reach the ground or fall out as precipitation under the location where it is observed. Under dry conditions, much of that water may evaporate before reaching the ground. Under windy conditions, much of that water may be blown off or advected horizontally to another location. Under conditions of significant vertical convective development, updrafts may carry that water to higher altitudes where it may be reclaimed or transported over longer distances to fall in remote regions. It is well known in academic publications that the correlation of rainfall rates observed at the ground decreases with increasing range of the radar observation from the radar, which most likely is related to the elevation of the radar sample volume above the surface. Gap-filling solutions may employ radars to decrease the data void under the floor of the existing radar system, and/or may employ in situ and other surface sensors to measure the incidence of precipitation at the surface.

(21) Figures of Merit for Target Identification Amid Signal Cluttering.

Clutter is often observed in existing systems related to the presence of manmade objects such as towers and wind power generators, natural factors such as vegetation, unrestricted radio transmissions in the bandpass allocated to weather radars, migrations of animals such as birds and butterflies, and Anomalous Propagation (AP). When clutter is severe, it may interfere with the proper operation of any weather radar system. Strategies that detect such clutter and ameliorate its effects may include gap-filling systems that supplement the existing network through a bypassing of the clutter, or systems which directly measure factors causing the clutter and allow the original systems to be de-cluttered.

(22) Superposition Method for Geobrowsers.

Figure 10:
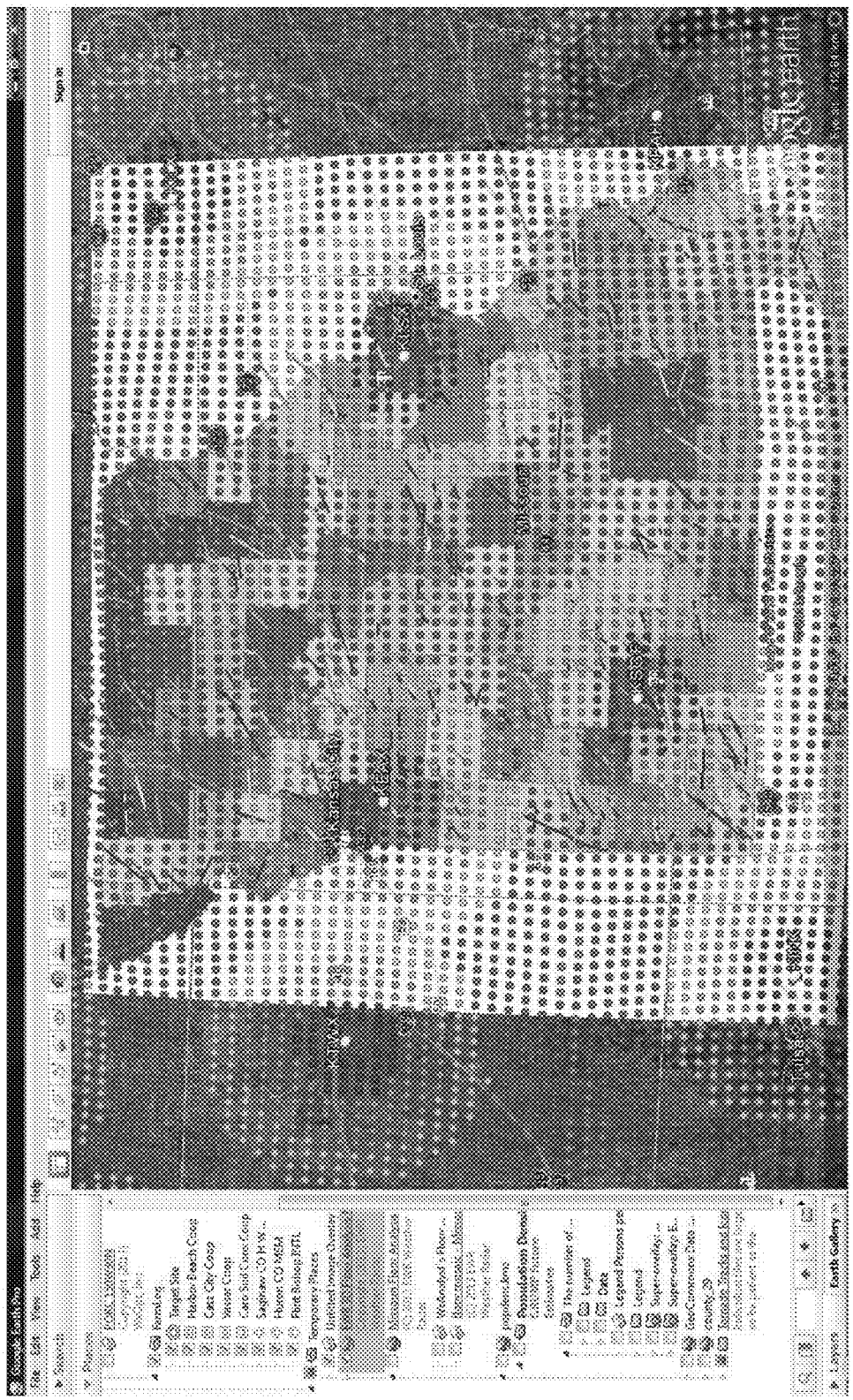
FIG. 10 is a color photo showing Composite depiction of gaps in radar coverage combined with the 2010 Census by county and known tornado tracks for 1950-2008.

Current geobrowser technology provides for the simultaneous display of surfaces which may overlap or intersect, and using graded transparency effects so that the information on two or more overlapping/intersecting surfaces may be viewed simultaneously. Such capability allows for the observation of differences and similarities between derived products and features which are collocated and displayed simultaneously. Examples of simultaneous display of multiple collocated surfaces include the occultation stack shown in FIG. 4, and the comparison of the Shipley Floor with population (FIG. 8) and tornado tracks (FIG. 9) for the State of Missouri as shown in FIG. 10.

(23) Generation of Combined or Composite Products.

Composite products are needed to convey the behavior of single variables across multiple systems when operating collectively. A good example for a composite product is the mosaic of the Shipley Floor created for the State of Missouri and shown in FIG. 5.

(24) Creation of Merged and/or Composite Products Using the Legacy Plus Gap-Filling Systems.

Composite products can also convey the behavior of single variables across an existing collection of systems when operating collectively and including a gap filling radar or other device.

(25) Addition of Supplemental Information for Confirmation and Validation.

Ground truth is included to demonstrate and test the operation of a system with and without inclusion of gap-filling subsystems. In general each system must be directly comparable to an independent test to prove its ability and value.

(26) Addition of Supplemental Information for Creation of Derived Products.

Algorithms which produce figures of merit or derived products from a system with and without gap-filling systems and devices may require or gain benefit from the additional provision of supplemental information. Such supplemental information may include independent spatial datasets such as the U.S. Census for derivation of the Figure of Merit. Supplemental information may also include independent observations from other systems and devices such as surface meteorological observations for the production of derived products.

(27) Compact System for Gap-Filling Operations "on the Fly."

EWR and WxAnalyst have prototyped a portable system capable of being operated from a laptop that can be used to conduct many of the analyses described herein. All Steps in FIG. 6 are supported, including the interactive creation and modification or editing of an existing system, the analysis of such system to generate figures of merit, the interactive creation and modification or editing of gap-filling systems, the analysis of such gap-filling systems to generate figures of merit, and the creation and display of derived products using a geobrowser such as Google Earth or other available technologies.

(28) Configuration for Calculation with Connection to the Internet.

Such a system as described in #21 is generally used with the geobrowser in its most common configuration, where that geobrowser is connected to the internet and accessing supplemental information such as a terrain database from its central repository.

(29) Configuration for Mobile and Tactical Systems without Connection to the Internet.

When geobrowser operations are required or beneficial to continue operation when the internet is unavailable, or when internet connectivity is avoided for security reasons, supplemental information such as terrain databases must be acquired from local sources. For such applications, WxAnalyst has developed a compact global database at multiple spatial resolutions that can be connected using an external hard drive. An SSD drive is preferred for reliable operations in high vibration or mechanically severe environments.

(30) Components Needed for Portable Operation.

Figure 11:
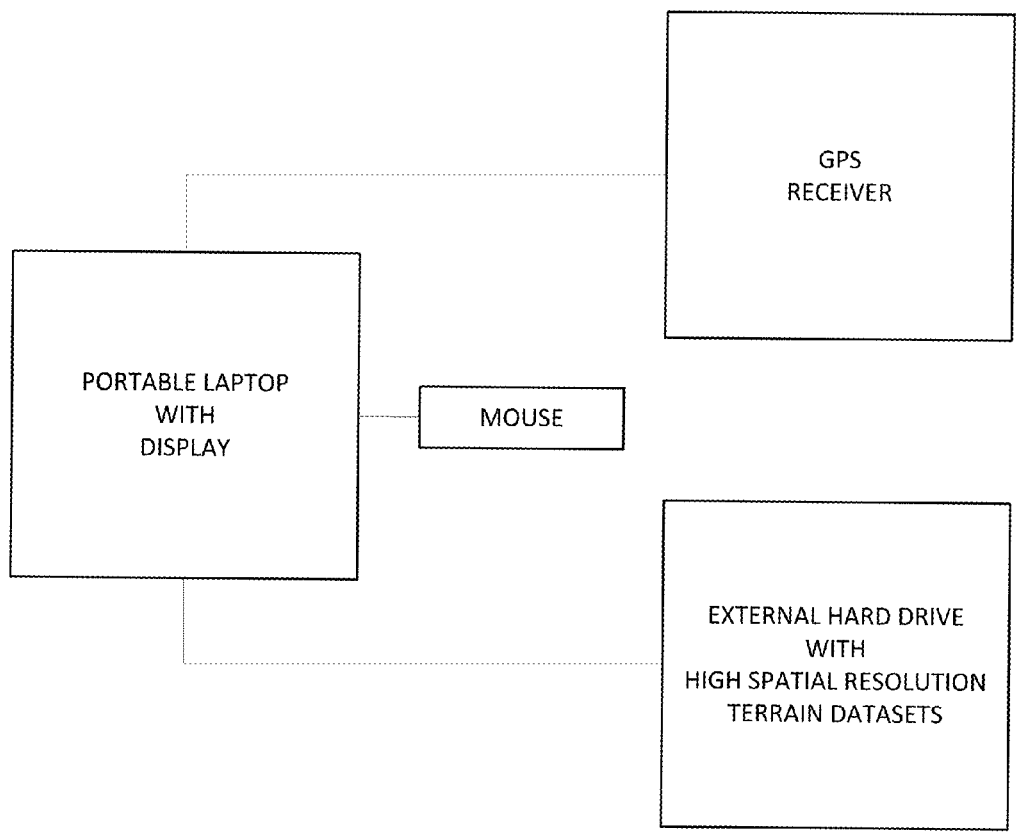
FIG. 11 is a block diagram showing a Laptop based system for portable analysis and placement of mobile gap filling systems. This system provides access to high spatial resolution terrain datasets using external hard drives, and operates without the requirement for connection to the internet. This laptop may include a GPS receiver for use in placing mobile gap filling systems and/or field testing a potential gap filling site.

EWR provides a portable computing system with software and external hard drives similar to the prototype shown in FIG. 11. This system is ideal for operations in remote locations where the internet is not available, or in secure environments where connection to the internet is not allowed.

(31) Strategies for Placement of Mobile Gap-Filling Systems.

The prioritization of gap-filling systems outlined in Step 3 can be prioritized with respect to any independent variable or derived metric. Such metrics may include cost of implementation, length of time required to implement, the population affected or covered by an improved gap filled area, or such other variable as may be needed to support the decision for implementation.

(32) Identification of Potential Sites with Access to Target Regions with Estimated Time of Arrival.

In the case of gap-filling sites that may be visited by a transportable gap-filling system or device, such sites may be ordered according to their placement along a travel route to reduce the time and fuel allocated to transporting the system or device to each site.

(33) Analysis of Potential Gap-Filling Sites in Order of Arrival.

Once an itinerary for arrival at gap-filling sites that may be visited by a transportable gap-filling system or device has been generated, a schedule for operations is generated for guidance to the field crew and other personnel who may be coordinating with the mobile system activities.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods and systems without departing from the scope of the invention, it is intended that all matter contained in the above description and shown in the accompanying drawings shall be interpreted as illustrative and not in a limiting sense.

What is claimed is:

1. A method of positioning a plurality of additional radar units in a defined area amongst one or more legacy radar units that provide legacy radar coverage in the defined area, the method comprising the steps of:
   identifying a location of each legacy radar unit;
   setting a threshold altitude;
   determining a legacy occultation of each legacy radar unit from a landscape level up to the threshold altitude;
   mapping the legacy occultation of the legacy radar units to provide a three dimensional occultation map in the defined area;
   locating gaps below the threshold altitude in the legacy radar coverage as a function of the occultation map;
   identifying a plurality of sites as a function of the gaps, wherein the sites are accessible to receive an X band radar unit;
   determining an anticipated radar coverage of an additional radar unit positioned at each of the sites;
   determining a reduction in the gaps as a function of the anticipated radar coverage; and
   selecting sites as a function of the reduced gaps.

2. The method of claim 1 further comprising the step of positioning an additional radar unit at the selected sites.

3. The method of claim 1 wherein the threshold altitude is at least one of the following:
   less than 15,000 feet;
   less than 12,000 feet;
   less than 10,000 feet;
   less than 5,000 feet;
   less than 1,000 feet; and
   less than 500 feet.

4. The method of claim 1 wherein the step of locating the gaps further comprises the step of calculating a percentage of the occultation map below the threshold altitude corresponding to the gaps and further comprising the step of reducing the percentage as a function of the anticipated radar coverage and wherein the selecting step further comprises selecting sites as a function of the reduced percentage corresponding to the gaps.

5. The method of claim 1 wherein the step of locating the gaps further comprises the step of calculating a population associated with the gaps and further comprising the step of reducing the calculated population as a function of a reduction in the gaps corresponding to the anticipated radar coverage and wherein the selecting step further comprises selecting sites as a function of the reduced calculated population.

6. The method of claim 1 further comprising the step of associating a cost with each of the sites and wherein the selecting step further comprises selecting sites as a function of the reduced gaps and of the cost associated with the sites.

7. The method of claim 6 wherein the associating step further comprises at least one of:
   associating a real estate cost with each of the sites;
   associating a utilities cost with each of the sites; and
   associating a maintenance cost with each of the sites.

8. The method of claim 1 wherein the step of determining the anticipated radar coverage further comprises determining an occultation of an X band radar unit at the sites, wherein the step of determining the anticipated radar coverage further comprises determining the occultation of the X band radar at a plurality of physical locations within a site, and wherein the step of determining the anticipated radar coverage further comprises selecting the physical location at the site that reduces the gaps.

9. The method of claim 1 wherein:
the step of locating the gaps further comprises the step of calculating a percentage of the occultation map occurring below the threshold altitude representative of the gaps;
the step of determining the anticipated radar coverage further comprises determining the occultation of the X band radar at a plurality of physical locations within a site and selecting the physical location at the site that reduces the percentage; and
the selecting step further comprises selecting sites as a function of the reduced percentage.

10. The method of claim 1 further comprising the step of setting a minimum percentage of reduction in a magnitude of the gaps and wherein the selecting step further comprises the step of selecting a minimum number sites that still achieve the set minimum percentage of reduction in the magnitude of the gaps and further comprising the step of positioning an X band radar unit at the selected sites.

11. The method of claim 1 wherein the step of determining the anticipated radar coverage further comprises determining an occultation of a C band radar unit at the sites and wherein the step of determining the anticipated radar coverage further comprises determining the occultation of the C band radar at a plurality of physical locations within a site.

12. The method of claim 1 wherein the step of determining the anticipated radar coverage further comprises determining an occultation of an S band radar unit at the sites and wherein the step of determining the anticipated radar coverage further comprises determining the occultation of the S band radar at a plurality of physical locations within a site.

13. The method of claim 1 wherein the additional radar units comprise an X band radar unit.

14. A non-transitory computer readable medium having instructions stored thereon which when executed by a computer, cause the computer to carry out the following steps:
receiving input data identifying a location of each legacy radar unit;
receiving input data setting a threshold altitude;
determining a legacy occultation of each legacy radar unit from a landscape level up to the threshold altitude;
mapping the legacy occultation of the legacy radar units to provide a three dimensional occultation map in the defined area;
color-coding gaps below the threshold altitude in the legacy radar coverage as a function of the occultation map;
receiving input identifying a plurality of sites as a function of the gaps, wherein the sites are accessible to receive an X band radar unit;
determining an anticipated radar coverage of an additional radar unit positioned at each of the sites;
color-coding the occultation map to reveal a reduction in the gaps as a function of the anticipated radar coverage.

15. The medium of claim 14 wherein the threshold altitude is at least one of the following:
less than 15,000 feet;
less than 12,000 feet;
less than 10,000 feet;
less than 5,000 feet;
less than 1,000 feet; and
less than 500 feet.

16. The medium of claim 14 wherein said system further comprises computer executable instructions for calculating a percentage of the occultation map below the threshold altitude corresponding to the gaps.

17. The medium of claim 16 wherein said system further comprises computer executable instructions for reducing the percentage as a function of the anticipated radar coverage.

18. The medium of claim 14 wherein said system further comprises computer executable instructions for calculating a population associated with the gaps.

19. The medium of claim 18 wherein said system further comprises computer executable instructions for reducing the calculated population as a function of a reduction in the gaps corresponding to the anticipated radar coverage.

20. The medium of claim 14 wherein said system further comprises computer executable instructions for at least one of:
associating a cost with each of the sites;
associating a real estate cost with each of the sites;
associating a utilities cost with each of the sites; and
associating a maintenance cost with each of the sites.

21. The medium of claim 14 wherein said system further comprises computer executable instructions for determining an occultation of an X band radar unit at the sites.

22. The medium of claim 21 wherein said system further comprises computer executable instructions for determining the occultation of the X band radar at a plurality of physical locations within a site.

23. The medium of claim 14 wherein said system further comprises computer executable instructions for:
calculating a percentage of the occultation map occurring below the threshold altitude representative of the gaps; and
determining the occultation of the X band radar at a plurality of physical locations within a site.

24. The medium of claim 14 wherein said system further comprises computer executable instructions for determining an occultation of a C band radar unit at the sites.

25. The medium of claim 24 wherein said system further comprises computer executable instructions for determining the occultation of the C band radar at a plurality of physical locations within a site.

26. The medium of claim 14 wherein said system further comprises computer executable instructions for determining an occultation of an S band radar unit at the sites.

27. The medium of claim 26 wherein said system further comprises computer executable instructions for determining the occultation of the S band radar at a plurality of physical locations within a site.

28. The medium of claim 14 wherein the additional radar units comprise an X band radar unit.

* * * * *